Oct. 5, 1937.  E. K. VON MERTENS  2,094,731
MEANS FOR GROOVING PINS
Filed Sept. 1, 1934  2 Sheets-Sheet 1

INVENTOR
Ernest K. von Mertens
BY Dean, Fairbank,
Hirsch & Foster.
ATTORNEYS

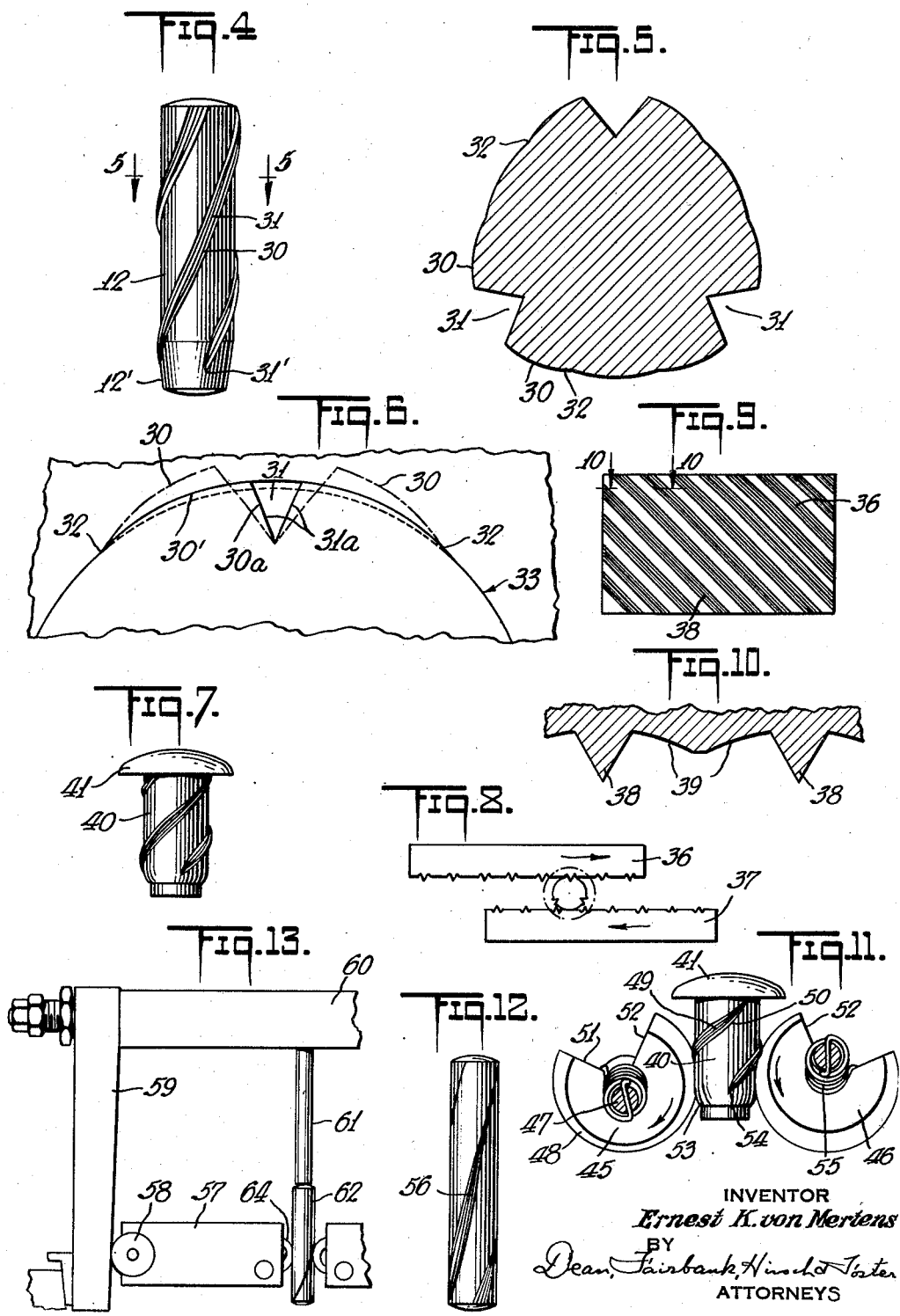

Patented Oct. 5, 1937

2,094,731

UNITED STATES PATENT OFFICE 2,094,731

MEANS FOR GROOVING PINS

Ernest K. von Mertens, New York, N. Y., assignor to Groov-Pin Corporation, Long Island City, N. Y., a corporation of New York Application September 1, 1934, Serial No. 742,472

1 Claim. (Cl. 80—6)

My present invention relates to the art of drive pins or studs of the type to be forced into aligned bored holes in two or more members to be thereby securely fastened together.

An object of the invention is to provide a pin or stud of the above type, made from simple cylindrical rod stock but conformed for greatly enhanced securing effectiveness.

A more specific object is to provide a drive pin or stud of the above type, affording an inherent interlock with the wall of the hole in which it is to be driven, and of length considerably greater than the length of the pin or stud.

Another object is to provide a simple method, expeditiously executed, for re-shaping cylindrical stock to produce the special conformation thereof, desired for attaining the foregoing objects.

Another object is to provide simple and rugged apparatus for expeditiously producing pins or studs of the above character.

A feature of the invention is the indentation or grooving of cylindrical rod stock to provide swellings, protuberances or ridges, which grip the wall of the hole, and interlock with metal from the wall of the hole displaced in driving the pin or stud into place, substantially to preclude withdrawal or loosening of the pin.

Another feature is the proportioning of the grooves and ridges of the drive pin or stud in such manner that the metal thereof reacts elastically in the distortion involved in driving the pin or stud in place.

In the accompanying drawings, in which are shown one or more of various possible embodiments of the several features of the invention, Fig. 1 is a plan view of a preferred form of die for producing the drive pin, Fig. 2 is a view in longitudinal cross-section taken on the line 2—2 of Fig. 1, Fig. 3 is a perspective view of a tool holder and a tool carried thereby.

Fig. 4 is a perspective view of a drive pin produced by the apparatus of Figs. 1 to 3, Fig. 5 is a transverse sectional view on a greatly enlarged scale taken on line 5—5 of Fig. 4, Fig. 6 is a fragmentary diagrammatic view on a still larger scale of the showing of Fig. 5 indicating the operation in actual use of the stud, Fig. 7 is a perspective view of a headed drive stud of generally similar construction, Fig. 8 is a diagrammatic end view showing alternative apparatus for producing a drive pin or stud, Fig. 9 is a plan view of one of the plates of Fig. 8 for rolling grooves, Fig. 10 is a sectional detail view on a greatly enlarged scale showing the rib construction of the plate of Fig. 9.

Fig. 11 is a diagrammatic perspective view indicating another embodiment for producing a drive stud similar to that of Fig. 7.

Fig. 12 is a diagrammatic view of a modification of the drive pin shown in Fig. 4, and Fig. 13 is a fragmentary diagrammatic view showing apparatus for producing the modified drive pin of Fig. 12.

Figure 1:
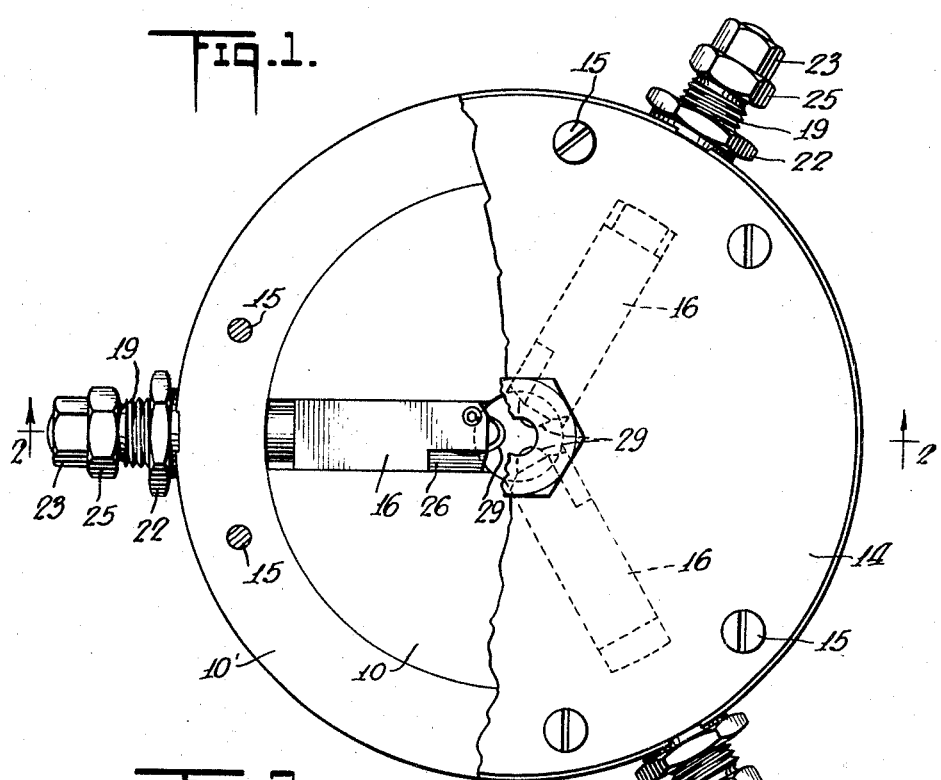
Figure 2:
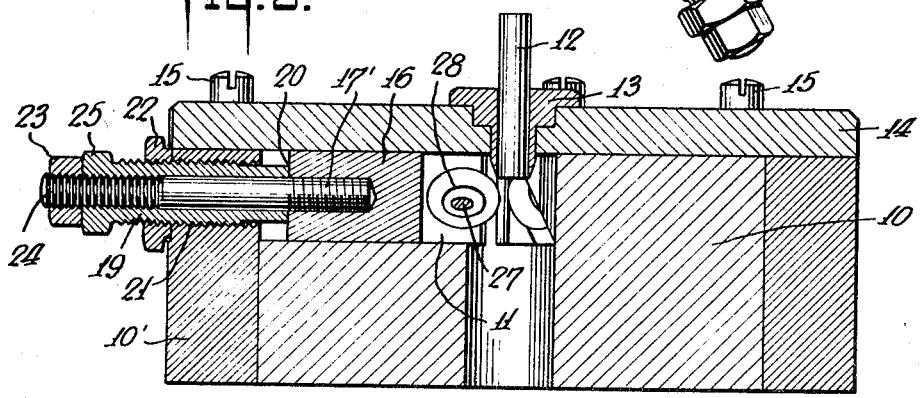

Referring now to the drawings, Figs. 1 and 2 shown a die comprising a steel block 10, preferably circular in cross-section, having a plurality, illustratively three, radial grooves 11 in its upper face, all rectangular in cross-section and serving for mounting tool holders with tools therein (to be described hereinafter), to operate upon cylindrical rod stock 12 fed therepast through an inlet socket piece 13 in a cover plate 14 secured to a shrunk ring 10' about the die block by bolts 15 and enclosing the tool holders. Each tool holder comprises a rectangular block 16 having threaded at 17', welded or otherwise rigidly secured thereinto a shank 17 protruding through a radial aperture in the shrunk ring 10', to which it is secured by suitable means, one embodiment of which is shown in the drawings. The securing means there shown comprises a bushing 19 encircling the shank 17 and abutting the tool holder 16 at 20 and threaded at 21 into the corresponding aperture of the ring 10'. A nut 22 threaded onto the exposed part of the bushing 19 locks the latter in position and a second nut 23 threaded upon the threaded extremity 24 of the shank 17 is clamped against the enlarged end 25 of the bushing 19. It is obvious that by loosening the nuts 22 and 23 and screwing the bushing 19 inward or outward as desired, the position of the tool holder along the rectangular groove may be adjusted in accordance with requirements.

The inner end of the tool holder 16 has an oblique slot 26 straddled by an oblique cross-pin 27 upon which is mounted for free rotation thereon a hardened steel roller 28 having a bevelled edge 29. Similar hardened steel rollers are mounted at corresponding angles in each of the tool holders and their contiguous advanced edges lie on a circle of diameter less than that of the bar steel stock 12 to be treated.

In use of the device, the rod steel stock 12 is simply fed through the inlet socket piece 13 and forced downward between the beveled edges of rollers 28. In this operation, no movement takes place of the steel rod with respect to the rollers, but these rollers, while remaining in secure frictional contact with rod stock, are rotated about their mounting cross-pins 27, their peripheries advancing at substantially the same linear speed as that with which the rod is forced through the die. In this operation the beveled edges of the obliquely mounted rollers grip the rod stock and make sharp indentations therein, and by reason of their inclinations effect a rotary movement of the rod stock as it is forced through, thereby to indent the rod stock along a line oblique to the length thereof, or in other words, to press screw grooves thereinto, having the triangular cross-section of the beveled rollers.

In this operation, it is readily seen that no cutting or shaving of the metal of the stock occurs but the metal is simply extruded or displaced from the indentation formed thereinto and in this displacement forms ridges 30, thrown up laterally of the respective grooves 31. These ridges extend snugly in contact with the beveled edge roller as the indentation is being made and thus afford a groove of depth considerably greater than the distance from the bottom of the groove to the normal periphery of the unworked cylindrical rod stock. The bulging ridges 30 gradually taper off in height, as shown, at 32, through a very substantial peripheral length of the rod stock, the median part of the rod stock between consecutive grooves alone retaining substantially the normal radius of the rod stock.

In the operation of the die of Figs. 1 and 2, the wall of the pin between successive bevelled rollers is left free or unconstrained, thereby to permit the extruded material to swell out and form the ridges 30 set forth, which are not flattened out until the pin is used, as will be set forth hereinafter.

The material of the pin is deformed over its elastic limit during the manufacturing process.

Driven into the hole, the pin is formed back only so far that a certain elastic condition results. For this reason steel should be used which has enough elasticity to withstand two deformations.

As will appear more fully presently, the pin when forced into the member or members which it is supposed to fill and/or connect, will resiliently resist the pressure exerted on the wall of the bore into which it is driven, thereby affording a far more secure hold than if the metal had no resiliency.

If desired, the advanced or lower end of stock 12 is slightly tapered as at 12' in Fig. 4 to form a pilot, which results in a sharp taper of the lower ends of grooves 31 as at 31'.

The finished drive pin as best shown in Fig. 4 thus includes helical triangular grooves 31, each of which has a sharp ridge 30 laterally of each side thereof, said ridges tapering off to the normal diameter of the stock, from which the drive pin is made.

In use, the pin is driven by a mallet or hammer or pressed by means of an arbor press into the corresponding hole, preferably bored with a tolerance of .001" to .002" plus, with respect to the diameter of the drive pin. As the pin is driven into place, it is the ridges 30 which effect the major frictional contact with the wall 33 of the bore, and these ridges become compressed to flatten them as at 30' to a fraction of their height as they are forcefully driven in. The ridge 30', which is considerably reduced from its original height in being thus driven in, has of course forced a corresponding depression into the wall 33 of the hole into which the pin has been driven.

In this flattening operation some of the metal of the ridge is displaced or flows laterally into grooves 31, as at 30a, thereby reducing the initial angle of said grooves shown at 31 in Fig. 5 to the more accurate angle shown at 31a in Fig. 6. In this action the depression which the ridge 30 forces into the bore 33 of the hole, as the end of the pin is driven in, will cause a rotary advance of the drive pin as it is driven home, thereby throwing up a corresponding wide but shallow thread in the bore 33, said thread in cross-section corresponding to the ridge 30 in the compressed or reduced form shown at 30'.

In this driving action, resulting in the sharp flattening of the ridges 30, the drive pin metal by virtue of its elasticity, exerts a powerful resilient radial gripping effect against the wall of the bore.

The drive pin is so securely held in place, that it is practically impossible to have it come loose, no matter how much pounding or vibration it may be subjected to in the use of the device or machine to which it is applied.

The bulging ridges 30, laterally of each groove, each extend for a very substantial width along opposite sides for the entire length of each of the helical grooves, which, in turn, are of length greater by far than that of the pin; the effective resilient securing area due to these ridges is almost equal to that of the original cylindrical area of the stock from which the drive pin was made. In addition, the interlock at 30' between the helical ridge of the drive pin and the hole into which it is forced preclude the possibility of coming loose, even under most severe condition of vibration.

The pin can, however, be removed, if desired, by resort to a punch, and used again in the same hole, and the metal by virtue of its elasticity, will resiliently engage the hole in each insertion. It is understood that for best action, the pin should be of metal having approximately the same hardness as that of the metal into which it is to be drawn.

In the embodiment of Figs. 8 to 10, is shown an alternative expedient for rolling threaded grooves on the rod stock by pressure on parallel plates 36 and 37 with oblique thread groove rolling teeth 38 therein. Ordinary toothed plates would not answer the purpose at all, because by them conventional screw thread grooves would be formed in which the cylindrical shape of the stock is maintained throughout the area between consecutive screw grooves. In the present embodiment, the metal of the plate 36 and 37 is undercut at 39 laterally of each of the grooves, the ridge formed by pressing the groove thereinto being accommodated by said undercut so that the desired and important ridges remain in the finished pin or stud.

While the embodiment of Figs. 8 to 10 is suitable for making drive pins such as shown in Fig. 4, it has particular utility in the production of the drive stud such as that shown in Fig. 7, which is similar to the drive pin of Fig. 4, except that its shank 40 has a head 41. By means of this head, the drive pin may be conveniently positioned above the plates 36 and 37, when these stand vertically in the rolling operation indicated in Fig. 8.

Figure 3:
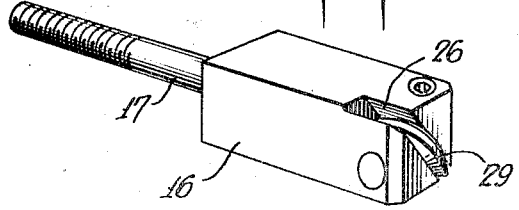

In Fig. 11, is shown another alternative means for producing the headed studs such as those of Fig. 7. Rollers with beveled rims 48 similar to those in Figs. 1 to 3 are employed, two of which are shown at 45 and 46. The rollers may be mounted as in Figs. 1 to 3 obliquely on corresponding pins 47. The beveled rims will indent the grooves 49 into the stud which they cause to rotate about its axis in the rolling operation, and ridges 50 are laterally formed in such rolling operation exactly as in the arrangement shown in Figs. 1 to 4. Each of the rollers 45 and 46, however, has a sector-shaped cut-out portion 51 by which the roller is permitted to form the groove substantially up to the head 41 of the pin, and which permit the stud to fall through thereafter, in the further rotation of the rollers. The stud 40 being reduced at its end 53, the helical groove 49 starts at a sharp pointed end 54 and assumes its full width and depth throughout the cylindrical length of the shank 40.

The springs 55 or equivalent return devices, will position or time the dies, so that the following stud head will correctly register with the die, to repeat the rolling operations, in a continuous succession of downward thrusts of consecutive studs.

In the embodiment of Fig. 12, is shown a stud similar to that of Fig. 4, except that the helical groove 56 is not of uniform cross-section from one end to the other of the pin, as in Fig. 4, but progressively becomes wider and deeper from the upper to the lower end.

In Fig. 13 is shown diagrammatically a modification of the die of Figs. 1 to 3, to produce the drive stud of Fig. 12. In this arrangement, the tool holders are slidably mounted in the grooves (not shown) of the die block 57 and have rollers 58 at their outer end, each engaging an upstanding slightly inclined track member 59, all of which are firmly secured to a cross-bar 60, which carries a central rod 61, by which the rod stock 62 is forced through the die. In operation, as the pin 62 is forced into the die by rod 61, the oblique tracks 59 correspondingly force the tool holders and with them, the grooving rollers 64 that are at their respective inner ends, inwardly, into the rod 62, causing the width and depth, of the groove to increase progressively, thereby to produce the pin shown in Fig. 12.

It will thus be seen that there is herein described apparatus and methods in which the several features of this invention are embodied, and which in action attain the various objects of the invention, and are well suited to meet the requirements of practical use.

As many changes could be made in the above construction, and many apparently widely different embodiments of this invention could be made without departing from the scope thereof, it is intended that all matter contained in the above description or shown in the accompanying drawings, shall be interpreted as illustrative, and not in a limiting sense.

Having thus described my invention, what I claim as new and desire to secure by Letters Patent is:

An apparatus for forming helical grooves on headed drive studs with tapered ends, said apparatus including a plurality of beveled edge rollers having oblique axes about which they are arranged to rock, each of said rollers having a sector slot to accommodate the head of the stud as the contiguous beveled edge of the roller approaches said head and a spring means normally returning the respective sector slots to original position after ejection of the completed stud.

ERNEST K. von MERTENS.